US010104584B2

(12) United States Patent
Cai

(10) Patent No.: US 10,104,584 B2
(45) Date of Patent: Oct. 16, 2018

(54) UPLINK DATA SPLITTING

(71) Applicant: BLACKBERRY LIMITED, Waterloo (CA)

(72) Inventor: Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 261 days.

(21) Appl. No.: 14/712,480

(22) Filed: May 14, 2015

(65) Prior Publication Data

US 2016/0337909 A1 Nov. 17, 2016

(51) Int. Cl.

*H04W 72/04* (2009.01)
*H04W 36/00* (2009.01)
*H04W 72/12* (2009.01)
*H04W 28/08* (2009.01)

(52) U.S. Cl.

CPC ... *H04W 36/0033* (2013.01); *H04W 72/1284* (2013.01); *H04W 28/08* (2013.01)

(58) Field of Classification Search

CPC ........... H04W 28/0278; H04W 28/085; H04W 16/32; H04W 72/0413

See application file for complete search history.

(56) References Cited

U.S. PATENT DOCUMENTS 9,264,930 B2 * 2/2016 Damnjanovic ... H04W 72/1252
2016/0234714 A1 * 8/2016 Basu Mallick ..... H04W 28/085

FOREIGN PATENT DOCUMENTS

EP 2854444 4/2015
GB 2494633 3/2013
WO 2014157898 10/2014

OTHER PUBLICATIONS

3GPP TSG-RAN WG2 #84, R2-133935; Agenda item 7.2.4; “BSR Reporting Options for Dual Connectivity”; San Francisco, CA, Nov. 2013, 3 pages.

3GPP TSG-RAN WG2 #84, R2-133997, Agenda item 7.2.4; “BSR Considerations for Dual Connectivity with Bearer Splitting”; Source: Qualcomm Incorporated; San Francisco, CA, Nov. 11-15, 2013; 3 pages.

3GPP TSG-RAN2, #84, R2-134005, Agenda item 7.2.2; “Discussion on RRC Signalling Via SeNB”; Source: ETRI; San Francisco, CA, Oct. 11-15, 2013; 3 pages.

3GPP TSG-RAN WG2 #85, R2-140043, Agenda item 7.2.3; “BSR and SR for Dual Connectivity”; Source: NSN, Nokia Corporation; Prague, Czech Republic, Feb. 10-14, 2014; 5 pages.

3GPP TSG-RAN2, #85, R2-140281, Agenda item 7.2.3; “BSR Transmission for Dual Connected UEs”; Source: Intel Corporation; Prague, Czech Republic, Feb. 10-14, 2014, 3 pages.

3GPP TSG-RAN WG2, #85, R2-140408, Agenda item 7.2.3; “BSR Consideration for Dual Connectivity”; Source: Qualcomm Incorporated; Prague, Czech Republic, Feb. 10-14, 2014; 3 pages.

(Continued)

*Primary Examiner* — Rhonda Murphy

(74) *Attorney, Agent, or Firm* — Trop, Pruner & Hu, P.C.

(57) ABSTRACT

A user equipment (UE) receives, from a plurality of wireless access network nodes, respective indicators, where the UE is concurrently connected to the plurality of wireless access network nodes. The UE determines, based on the indicators, a split of uplink data in a buffer of the UE into a plurality of uplink data portions for transmission by the UE to the respective wireless access network nodes.

16 Claims, 12 Drawing Sheets

MACRO CELL
102
104
MACRO CELL eNB
142
146
144
SMALL CELL
112
116
140
114
SMALL CELL eNB
SMALL CELL
106
110
108
SMALL CELL eNB
122
CORE NETWORK
CONTROL NODE
124
DATA GATEWAY
126
EXTERNAL PACKET DATA NETWORK
128

(56) References Cited

OTHER PUBLICATIONS

3GPP TSG-RAN WG2, #85, R2-140475, Agenda item 7.2.3; "BSR Reporting Options for Dual Connectivity"; Source: Panasonic; Prague, Czech Republic, Feb. 2014; 3 pages.
3GPP TSG-RAN WG2, #85, Tdoc R2-140656, agenda item 7.2.3; "BSR and LCP Procedures for Split Bearers"; Source: Ericsson; Prague, Czech Republic, Feb. 10-14, 2014; 4 pages.
3GPP TS 36.211 V12.5.0; 3rd Generation Partnership Project; Technical Specification Group Radio Access Network; Evolved Universal Terrestrial Radio Access (E-UTRA); "Physical Channels and Modulation"; Release 12, Mar. 2015; 136 pages.
3GPP TS 36.300 V12.5.0; 3rd Generation Partnership Project; Technical Specification Group Radio Access Network; Evolved Universal Terrestrial Radio Access (E-UTRA) and Evolved Universal Terrestrial Radio Access Network (E-UTRAN); "Overal Description"; Stage 2, Release 12; Mar. 2015; 251 pages.
3GPP TS 36.321 V12.5.0; 3rd Generation Partnership Project; Technical Specification Group Radio Access Network; Evolved Universal Terrestrial Radio Access (E-UTRA); "Medium Access Control (MAC) Protocol Specification"; Release 12; Mar. 2015; 77 pages.
3GPP TS 36.322 V12.2.0; 3rd Generation Partnership Project; Technical Specification Group Radio Access Network; Evolved Universal Terrestrial Radio Access (E-UTRA); "Radio Link Control (RLC) Protocol Specification"; Release 12; Mar. 2013; 40 pages.
3GPP TS 36.323 V12.3.0; 3rd Generation Partnership Project; Technical Specification Group Radio Access Network; Evolved Universal Terrestrial Radio Access (E-UTRA); "Packet Data Convergence Protocol (PDCP) Specification"; Release 12; Mar. 2015; 33 pages.
3GPP TS 36.331 V12.5.0; 3rd Generation Partnership Project; Technical Specification Group Radio Access Network; Evolved Universal Terrestrial Radio Access (E-UTRA); "Radio Resource Control (RRC)"; Protocol Specification, Release 12; Mar. 2015; 445 pages.
3GPP TS 36.423 V12.5.0, Technical Specification, 3rd Generation Partnership Project; Technical Specification Group Radio Access Network; Evolved Universal Terrestrial Radio Access Network (E-UTRAN); X2 application protocol (X2AP) (Release 12), Mar. 2015 (208 pages).
3GPP TSG RAN WG2 Meeting #84, R2-134055, San Francisco, USA, Nov. 11-Nov. 15, 2013, Source: CATT, Title: Impact on BSR reporting, Agenda Item: 7.2.2.2, Document for: Discussion and Decision (3 pages).
European Patent Office, International Search Report and the Written Opinion for PCT/US2016/031642 dated Jul. 27, 2016 (10 pages).

* cited by examiner

UPLINK DATA SPLITTING

BACKGROUND

As the demand for wireless data communication using wireless user equipments (UEs) has increased, service providers are increasingly facing challenges in meeting capacity demands in regions where the density of users is relatively high. To address capacity issues, small cells can be deployed in mobile communication networks.

BRIEF DESCRIPTION OF THE DRAWINGS

Some implementations are described with respect to the following figures.

DETAILED DESCRIPTION

Figure 1:
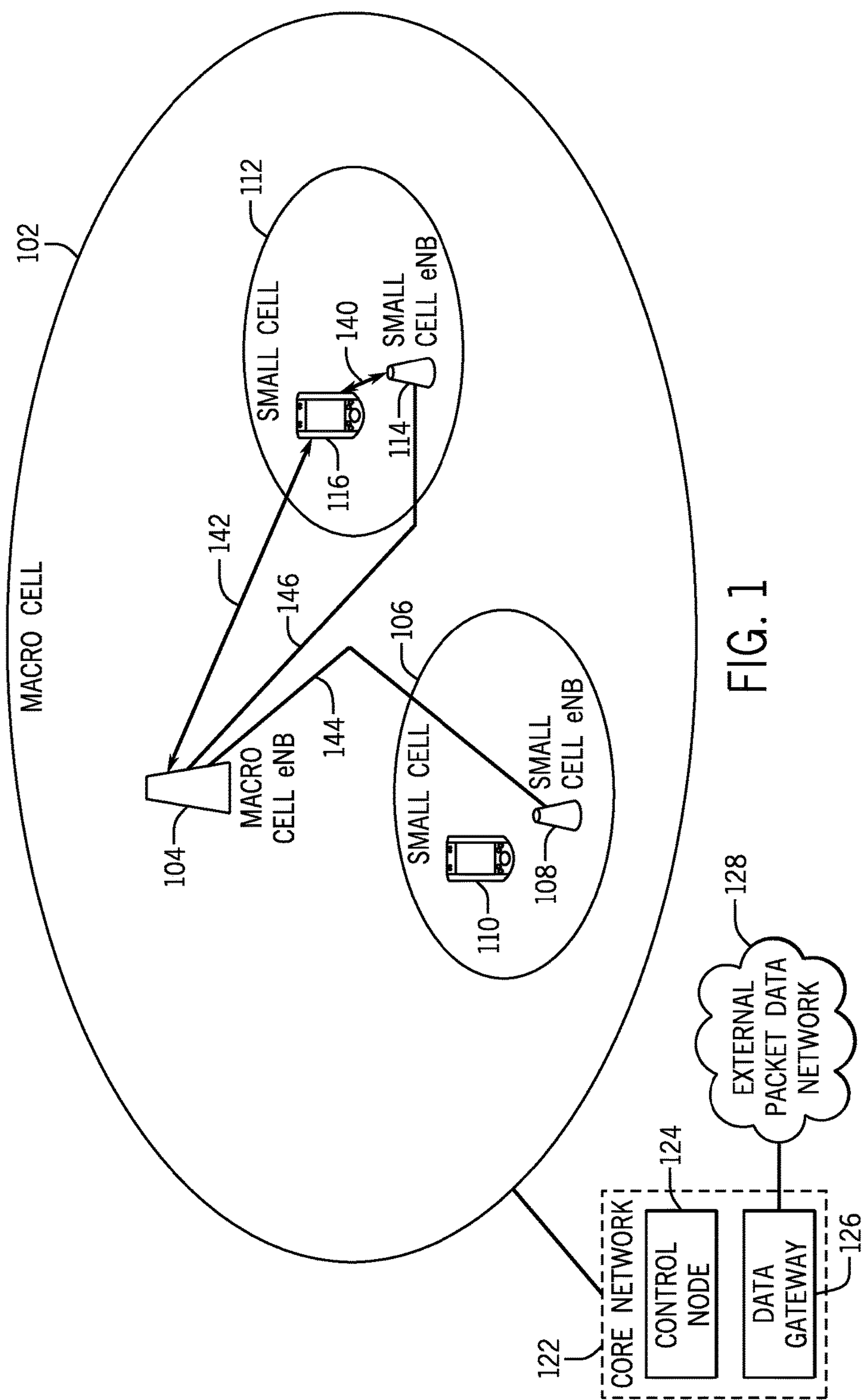
FIG. 1 is a schematic diagram of an example network arrangement according to some implementations.

An example heterogeneous network arrangement is shown in FIG. 1, which includes a macro cell 102 and various small cells 106, 112 within the coverage area of the macro cell 102. Although just two small cells 106 and 112 are depicted in FIG. 1, it is noted that there can be additional small cells within the coverage area of the macro cell 102. Also, there can be multiple macro cells. The macro cell 102 is provided by a macro cell wireless access network node 104, while the small cells 106, 112 are provided by respective small cell wireless access network nodes 108, 114.

The small cell wireless access network nodes 108, 114 can include one or more of the following: pico cell wireless access network nodes, femto cell wireless access network nodes, and relay nodes. A macro cell wireless access network node generally is considered a higher power network node, since it is able to transmit wireless signals at a higher power level. Pico cell wireless access network nodes, femto cell wireless access network nodes, and relay nodes are generally considered lower power network nodes, since such network nodes transmit signals at a lower power level than the transmissions of the macro cell wireless access network node.

A pico cell refers to a cell that has a relatively small coverage area, such as within a building, a train station, airport, aircraft, or other small areas. A femto cell is a cell that is designed for use in a home or small business. A femto cell is associated with a closed subscriber group (CSG), which specifies that only users within a specific group are allowed to access the femto cell. A relay node is used for relaying data from one wireless entity to another wireless entity.

As depicted in FIG. 1, the macro cell 102 provided by the macro cell wireless access network node 104 can overlay the coverage areas of the lower power network nodes. In the ensuing discussion, lower power network nodes such as pico cell wireless access network nodes, femto cell wireless access network nodes, and relay nodes are referred to as small cell wireless access network nodes. The cells provided by the lower power network nodes are referred to as small cells.

FIG. 1 further depicts user equipments (UEs) 110 and 116. The UE 110 is within the coverage area of the small cell 106, while the UE 116 is within the coverage area of the small cell 112. Note that both UEs 110 and 116 are within the coverage area of the macro cell 102. Although just two UEs are shown in FIG. 1, it is noted that additional UEs can be present in other examples. Examples of UEs can include smartphones, notebook computers, tablet computers, wearable devices, game appliances, and other types of electronic devices that are capable of wireless communications.

A first wireless connection 140 can be established between the UE 116 and the small cell wireless access network node 114. In addition, a second wireless connection 142 can be established between the UE 116 and the macro cell wireless access network node 104. In such an arrangement, the UE 116 is considered to have established dual concurrent wireless connections with the macro cell wireless access network node 104 and the small cell wireless access network node 114. In other examples, the UE 116 can establish multiple (two or more) concurrent wireless connections with the macro cell wireless access network node 104 and with multiple small cell wireless access network nodes. In some other examples, the UE 116 can establish multiple concurrent wireless connections with multiple macro cell wireless access network nodes and with multiple small cell wireless access network nodes.

The UE 110 can similarly establish multiple concurrent wireless connections with one or more macro cell wireless access network nodes and one or more small cell wireless access network nodes.

The UEs 110 and 116 are examples of dual-connection (or more generally, multi-connection) capable UEs that are able to establish dual (or multiple) concurrent connections with the macro cell wireless access network node 104 and one or more small cell wireless access network nodes. In some cases, a legacy UE (not shown) may be present in the coverage area of the macro cell 102, where the legacy UE is not capable of establishing multiple concurrent wireless connections.

The UEs 110 and 116 are able to receive downlink (DL) data sent by wireless access network nodes, and to transmit uplink (UL) data to the wireless access network nodes, over respective wireless connections. To transmit UL data, a UE is granted UL resources associated with a wireless connection between the UE and the respective wireless access network node. In some examples, a UL grant is contained in a UL grant message sent by the wireless access network node to the UE. The UL grant can specify, as examples, one or more subframes of a frame in which the UE can send UL data. A subframe can refer to a segment (having a specified time length) of an overall frame (which can be a container to carry information over a wireless connection). In other examples, UL grants can specify other types of resources of the wireless connection that are used by the UE to send UL data.

The UL grants provided by the wireless access network node can be based on the amount of UL data that the UE has available for transmission from the UE to the wireless access network node. In some examples, a buffer status report (BSR) can used by the UE to indicate the amount of UL data in a buffer (or buffers) of the UE that is available for transmission over the uplink. A BSR is a message sent by the UE to a wireless access network node.

A UE has various different protocol layers (discussed further below), where some of the protocol layers can have respective UL data that is to be transmitted in the uplink from the UE to respective multiple wireless access network nodes (assuming the UE is concurrently connected to the multiple wireless access network nodes). As explained in further detail below, a first issue (referred to as "Issue 1" below) of some example BSR techniques is that such BSR techniques do not differentiate between UL data of the different protocol layers, which can lead to inefficient resource allocation for transmission of the UL data to the multiple wireless access network nodes (including a macro cell wireless access network node and at least one small cell wireless access network node). A further issue (referred to below as "Issue 2") is in the determination of how to split UL data of at least one protocol layer in the UE between a macro cell wireless access network node and a small cell wireless access network node.

In accordance with some implementations of the present disclosure, to address Issue 1, BSR techniques or mechanisms used by a UE is able to differentiate between UL data of different protocol layers, so that more efficient allocation of UL resources can be performed in communicating the UL data to multiple wireless access network nodes to which the UE is concurrently connected. Also, to address Issue 2 in further implementations of the present disclosure, techniques or mechanisms are provided to allow the UE to determine a split of UL data in a buffer of the UE into multiple UL data portions for transmission by the UE to respective wireless access network nodes.

FIG. 1 also shows a backhaul link 144 or 146 between the macro cell wireless access network node 104 and each respective small cell wireless access network node 114 or 108. The backhaul link 144 or 146 can represent a logical communication link between two nodes; the backhaul link can either be a direct point-to-point link or can be routed through another communication network or node. In some implementations, a backhaul link can be a wired link. In other implementations, a backhaul link can include a wireless link.

In some implementations, the macro cell 102 (and more specifically the macro cell wireless access network node 104) can provide all of the control plane functions on behalf of a UE, while a small cell (more specifically the corresponding small cell wireless access network node) provides at least a portion of the user plane functions for a multi-connection capable UE (a UE that is capable of concurrently connecting to macro and small cells). Note that the macro cell wireless access network node 104 can also provide user plane functions for the multi-connection capable UE.

Control plane functions involve exchanging certain control signaling between the macro cell wireless access network node 104 and a UE to perform specified control tasks, such as any or some combination of the following: network attachment of the UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane functions relate to communicating traffic data (e.g. voice data, user data, application data, etc.) between the UE and a wireless access network node. User plane functions can also include exchanging control messages between a wireless access network node and a UE associated with communicating the traffic data, flow control, error recovery, and so forth.

A small cell connection can be added to or removed from a UE under the control of the macro cell wireless access network node 104. In some implementations, the action of adding or removing a small cell for a UE can be transparent to a core network 122 of the mobile communications network. The core network 122 includes a control node 124 and a data gateway 126. Although just one control node 124 and data gateway 126 is shown in FIG. 1, it is noted that in other examples, multiple control nodes 124 and/or multiple data gateways 126 can be provided.

The data gateway 126 can be coupled to an external packet data network (PDN) 128, such as the Internet, a local area network (LAN), a wide area network (WAN), and so forth. FIG. 1 depicts the macro cell wireless network node 104 connected to the control node 124 and data gateway 126 of the core network 118. Although not shown, it is noted that the small cell wireless access network nodes can also be connected to the core network nodes.

Note that a legacy UE (a UE that is not capable of establishing multiple concurrent wireless connections with a macro cell and one or more small cells) can connect to either a macro cell or a small cell using standard wireless connection techniques.

When a UE moves under the coverage of a small cell, the macro cell wireless access network node 104 may decide to offload some of the user plane traffic to the small cell. This offload is referred to as data offload. When data offload has been performed from the macro cell 104 to the small cell, then a UE that has a dual connection can transmit or receive data to and from the corresponding small cell wireless access network node. Additionally, the UE may also communicate user plane traffic with the macro cell wireless access network node 104. Although reference is made to data offload to one small cell, it is noted that in other examples, the macro cell 104 can perform data offload for the UE to multiple small cells.

In some examples, the data offload causes the offloaded data to be communicated between the macro cell wireless access network node 104 and the respective small cell wireless access network node 108 or 114 over the respective backhaul link 144 or 146.

In the ensuing discussion, reference is made to a dual-connection capable UE, which is a UE that is capable of establishing dual concurrent connections with the macro cell wireless access network node 104 and a small cell wireless access network node 106 or 112. It is noted that techniques or mechanisms according to some implementations can be extended to scenarios where a UE has established more than two concurrent connections with the macro cell wireless access network node 104 and multiple small cell wireless access network nodes.

Also, in the ensuing discussion, reference is made to mobile communication networks that operate according to the Long-Term Evolution (LTE) standards as provided by the Third Generation Partnership Project (3GPP). The LTE standards are also referred to as the Evolved Universal Terrestrial Radio Access (E-UTRA) standards.

Although reference is made to E-UTRA in the ensuing discussion, it is noted that techniques or mechanisms according to some implementations can be applied to other wireless access technologies, such as 5G (fifth generation) wireless access technologies, 6G wireless access technologies, wireless local area network (WLAN) technologies (e.g. as provided by IEEE 802.11), and so forth.

In an E-UTRA network, a wireless access network node can be implemented as an enhanced Node B (eNB), which includes functionalities of a base station and base station controller. Thus, in an E-UTRA network, a macro cell wireless access network node is referred to as a macro cell eNB (e.g. 104 in FIG. 1). In an E-UTRA network, small cell wireless access network nodes can be referred to as small cell eNBs (e.g. 108 and 114 in FIG. 1).

In an E-UTRA network, the control node 124 in the core network 122 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro cell eNBs, authentication of a user, generation and allocation of a temporary identity to a UE, and so forth. In other examples, the MME can perform other or alternative tasks. The MME is connected over an interface to the macro cell eNB 104.

In an E-UTRA network, the data gateway 126 of the core network 122 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 124. The PDN-GW is the entry and egress point for data communicated between a UE in the E-UTRA network and a network element coupled to the PDN 128. Note that there can be multiple PDNs and corresponding PDN-GWs. Moreover, there can be multiple MMEs and SGWs.

Figure 2:
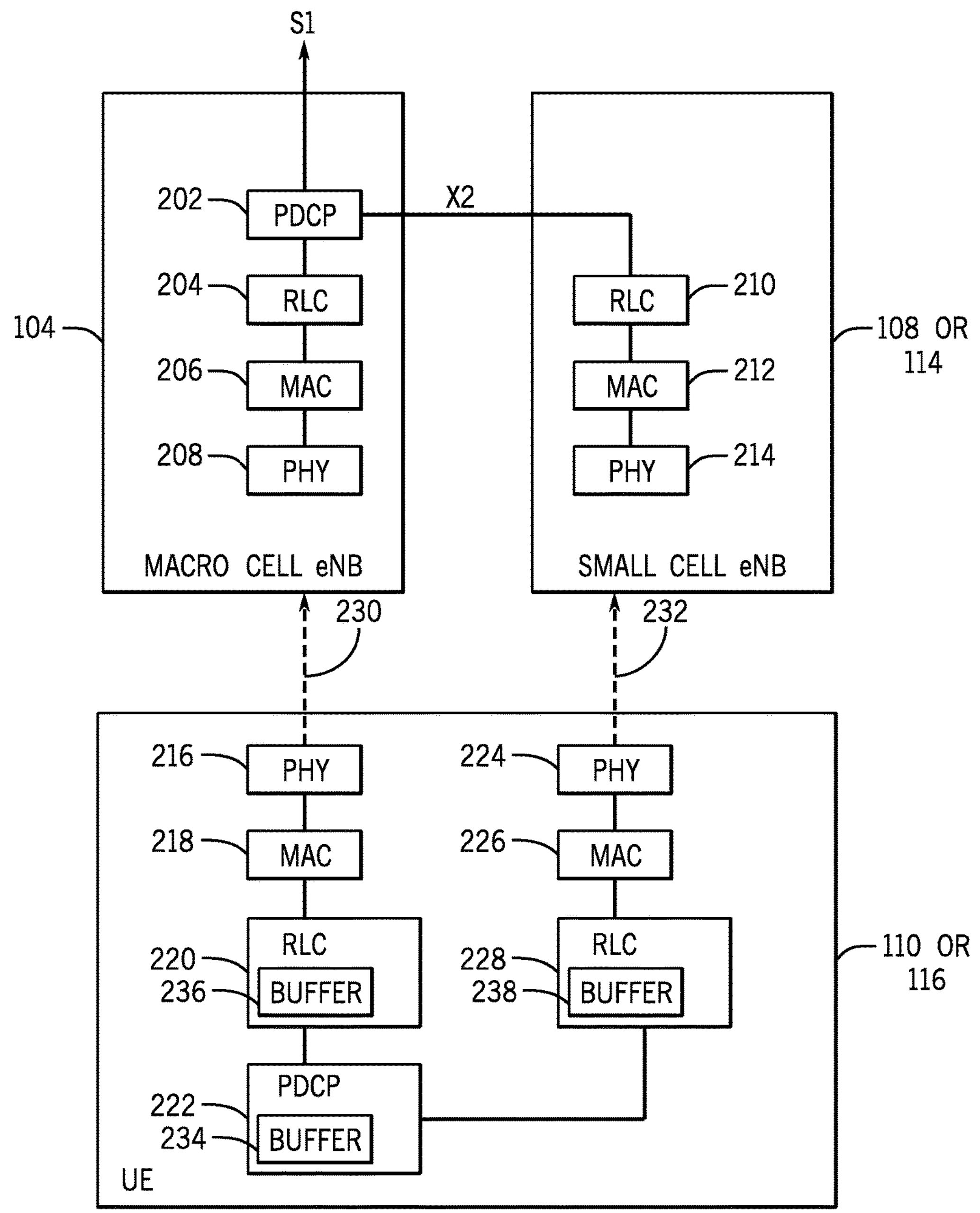
FIG. 2 is a block diagram of example protocol layers in wireless access network nodes and a user equipment (UE), according to some implementations.

Various protocol layers are provided in the macro cell eNB 104 and each small cell eNB to perform communications in the user plane. FIG. 2 is a schematic diagram of user plane protocol stacks in the macro cell eNB 104 and the small cell eNB 108 or 114, as well as the UE 110 or 116. FIG. 2 shows communication of data in the UL direction. The same protocol layers can be used for DL data transmissions.

Although FIG. 2 shows a UE that has dual connections to the macro cell eNB 104 and the small cell eNB 108 or 114, it is noted that in other examples, the UE can have just one connection to one of the macro cell eNB or small cell eNB.

In the macro cell eNB 104, the user plane protocol stack can include the following protocol layers: a Packet Data Convergence Protocol (PDCP) layer 202, a Radio Link Control (RLC) layer 204, a Medium Access Control (MAC) layer 206, and a physical (PHY) layer 208. The PHY layer 208 is considered the lowest level protocol layer, while the MAC layer 206 is above the PHY layer 208, the RLC layer 204 is above the MAC layer 206, and the PDCP layer 202 is above the RLC layer 204.

Depending on where the user plane protocol stack split occurs, at least some of these protocol layers can be included in the small cell eNB 108 or 114. Splitting a user plane protocol stack at a given point results in multiple user plane paths, with one user plane path through the macro cell eNB 104 and another user plane path through the small cell eNB.

Distribution of user plane data along the different user plane paths can involve data distribution at the radio bearer (RB) level. Thus, for example, data of some data radio bearers (DRBs) can be communicated over the user plane path through the small cell eNB 108 or 114, while data of other DRBs can be communicated over the user plane path through the macro cell eNB 104. Communicating data of some DRBs over a user plane path that extends through a small cell eNB can be referred to as offloading the data of such DRBs from the macro cell eNB to the small cell eNB.

Assuming the split occurs after the PDCP layer 202, the protocol stack of the small cell eNB 108 or 114 can include an RLC layer 210, a MAC layer 212, and a PHY layer 214, as shown in FIG. 2. A split of user plane protocol stack at another point can result in different protocol layers provided in the small cell eNB.

Note that there can be other protocol layers in the macro cell eNB 104 and the small cell eNB 108 or 114 that are not shown in FIG. 2. Note also that similar protocol layers are also present in a UE.

The physical layer 208 or 214 is the lowest layer in the corresponding node. The physical layer 208 or 214 can include networking hardware for transmitting signals over a wireless link. The MAC layer 206 or 212 provides addressing and channel access control mechanisms.

The RLC layer 204 or 210 can provide at least some of the following example functionalities, as described in 3GPP TS 36.322:

- transfer of upper layer PDUs (from the PDCP layer 202);
- error correction, such as by using Automatic Repeat reQuest (ARQ);
- concatenation, segmentation, and reassembly of RLC Service Data Units (SDUs);
- reordering of RLC data Protocol Data Units (PDUs);
- duplicate data detection;
- discarding of an RLC SDU;
- RLC re-establishment; and
- protocol error detection.

The PDCP layer 202 can provide at least some of the following functionalities in the user plane, as described in 3GPP TS 36.323:

- header compression and decompression;
- transfer of user data;
- in-sequence delivery of upper layer PDUs;
- duplicate detection of lower layer SDUs;
- retransmission of PDCP SDUs;
- ciphering and deciphering; and
- timer-based SDU discard.

FIG. 2 also shows protocol layers in the UE 110 or 116. The protocol layers of the UE 110 or 116 correspond to the protocol layers present in the macro cell eNB 104 and the small cell eNB 108 or 114. For transmission of UL data (230) from the UE to the macro cell eNB 104, the UE uses the following protocol layers: PHY layer 216, MAC layer 218, RLC layer 220, and PDCP layer 222.

For transmission of UL data (232) from the UE to the small cell eNB 108 or 114, the UE uses the following protocol layers: PHY layer 224, MAC layer 226, RLC layer 228, and PDCP layer 222.

When the PDCP layer 222 in the UE receives a data unit (referred to as a PDCP Service Data Unit, SDU) to be transmitted in the UL direction, the PDCP SDU is placed in a PDCP buffer 234. The PDCP layer 222 can send a PDCP Protocol Data Unit (PDU) corresponding to the PDCP SDU to a lower protocol layer, namely the RLC layer 220 or 228. Note that the PDCP SDU is received by the PDCP layer 222, while the PDCP PDU is the data unit that includes content of the PDCP SDU sent by the PDCP layer 222. The PDCP SDU is received by the PDCP layer 222 from a higher protocol layer, while the PDCP PDU is sent by the PDCP layer 222 to a lower protocol layer.

A PDCP PDU can include a PDCP control PDU, which carries control information, or a PDCP data PDU, which carries bearer data such as voice data, application data, or user data.

The PDCP PDU sent by the PDCP layer 222 is received by the RLC layer 220 or 228 as an RLC SDU. Upon receiving an RLC SDU from the PDCP layer 222, the RLC layer 220 or 228 places the RLC SDU into a respective RLC buffer 236 or 238. The RLC layer 220 or 228 can send an RLC PDU that contains content of a buffered RLC SDU (as buffered in the RLC buffer 236 or 238) in the RLC data PDU. The RLC PDU is sent by the RLC layer 220 or 228 to a lower protocol layer, namely the MAC layer 218 or 226.

An RLC PDU can include an RLC control PDU, which carries control information, or an RLC data PDU, which carries bearer data such as voice data, application data, or user data.

A BSR can be sent by the UE to a respective eNB (104, 108, or 114). In some implementations, the BSR is sent in a MAC Control Element (CE).

For the BSR, the UE considers the following as data available for UL transmission in the RLC layer 220 or 228:

- RLC SDUs, or segments thereof, in the RLC buffer 236 or 238 that have not yet been included in an RLC data PDU; and
- RLC data PDUs or portions thereof, that are pending for retransmission (in RLC acknowledged mode (AM)).

For the BSR, the UE considers PDCP control PDUs, as well as the following as data available for transmission in the PDCP layer 222. For PDCP SDUs in the PDCP buffer 234 for which no PDCP PDU has been submitted to lower layers, the following are considered data available for UL transmission in the PDCP layer:

- The PDCP SDU itself, if the PDCP SDU has not yet been processed by the PDCP layer 222; and
- The PDCP PDU if the PDCP SDU has been processed by the PDCP layer 222.

In the context of FIG. 2, in some examples, the BSR sent by the UE can include data available for UL transmission in the RLC layers 220 and 228 and in the PDCP layer 222. As an example, the RLC layer 220 has X bytes of data, and the RLC layer 228 has Y bytes of data. Also, a PDCP layer 222 has Z bytes of data. Then, the BSR that is sent by the UE indicates the amount of UL data as being equal to X+Y+Z. Upon receiving the BSR, UL grants can be provided that are sufficient to allow the UE to transmit the X+Y+Z bytes of UL data. The UL grants can be assigned by both the macro cell eNB and the small cell eNB.

Some example BSR reporting techniques do not differentiate between PDCP data and the RLC data in the BSR (this is referred to as Issue 1 above). Thus, if the UE sends a BSR to the macro cell eNB, and another BSR to the small cell eNB, then double reporting of the amount of the PDCP UL data can be provided to both the macro cell eNB and the small cell eNB. Furthermore, if the BSR does not differentiate between the RLC UL data of the RLC layer 220 and the RLC UL data of the RLC layer 228, then each eNB (macro cell eNB or small cell eNB) would not be able to differentiate between RLC UL data that is to be sent to the respective eNB. Thus, for example, the macro cell eNB or small cell eNB is not made aware of how much RLC UL data is buffered specifically for the macro cell eNB or small cell eNB. As a result, for example, the macro cell eNB may inefficiently allocate resources for transmission of the RLC UL data that the UE can only ever send to the small cell eNB, and vice versa.

Issue 2 is associated with splitting UL data, and more specifically, PDCP UL data, between the macro cell eNB and the small cell eNB. To reduce inefficiency, the UL bearer split should avoid extensive coordination between the macro cell eNB and the small cell eNB. Moreover, to avoid scalability issues, a centralized arrangement (such as at the macro cell eNB or another network node) for determining the UL bearer split should be avoided.

Network-Assisted UE-Based Buffer Status Reporting

Figure 3:
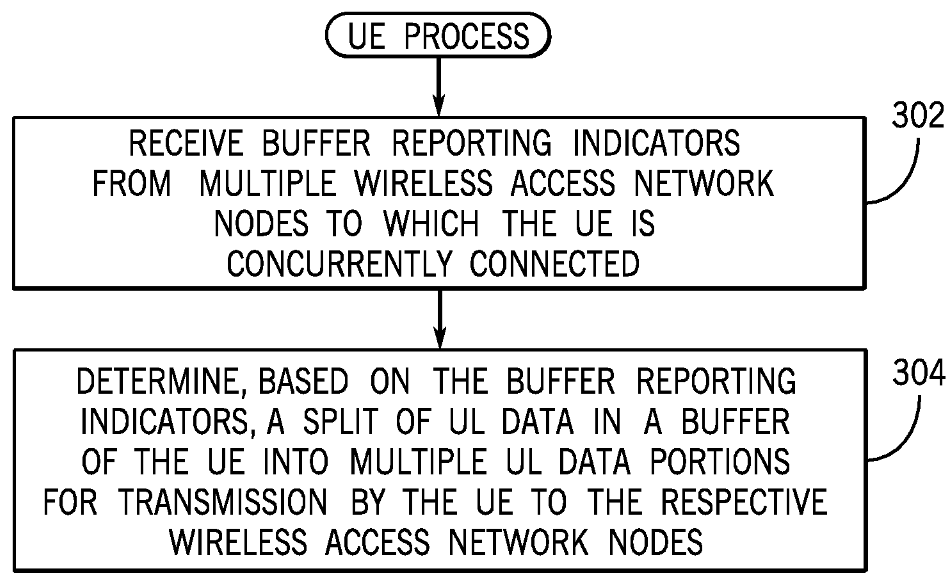
FIG. 3 is a flow diagram of an example process of a UE, according to some implementations.

To address Issue 2 discussed above, a network-assisted UE-based buffer status reporting technique or mechanism can be used. As shown in FIG. 3, this technique or mechanism can be implemented at a UE, which receives (at 302) buffer reporting indicators (BRIs) sent individually by the macro cell eNB and a small cell eNB. The UE is concurrently connected to the macro cell eNB and the small cell eNB. The BRI from an eNB (macro cell eNB or small cell eNB) has a value (referred to as a BRI value) that is based on one or more factors, discussed further below. Based on the BRI values, the UE determines (at 304) a split of UL data in a buffer of the UE into multiple UL data portions for UL transmission by the UE to respective eNBs (the macro cell eNB and the small cell eNB). In some implementations of the present disclosure, the split of UL data in the buffer is a split of UL data in the PDCP buffer 222 (FIG. 2) of the UE.

More specifically, in some implementations, the UE determines the split of the PDCP buffer size based on the received BRI values. The UE then prepares BSRs accordingly to send to the macro cell eNB and the small cell eNB.

Generally, the BRI value sent by an eNB (macro cell eNB or small cell eNB) is based on at least one or some combination of the following factors: UL radio resource availability (availability of UL radio resources to carry UL data), the UE's UL channel conditions, buffer occupancy of a buffer in the UE (e.g. what percentage of the buffer is occupied), average queuing delay in a buffer of the UE (e.g. average length of time that a data unit in the buffer waits before transmission by the UE), UL traffic loading (traffic loading on the uplink), an interference condition of the uplink (due to interference from other sources), a number of users, user's preference, and/or other factors.

Further, the determination of the BRI value can also be dependent on the type of eNB (macro cell eNB versus small cell eNB), and a status of a backhaul connection between the small cell eNB and the macro cell eNB.

The BRI can be in any one of various different forms. In an example, a BRI can be an absolute value ranging from 0 to N−1 (N>1), represented by M bits (M≥1). In another example, a BRI can represent different conditions; for example, the BRI can include multiple fields, such as one or more of the following: a field indicating UL radio resource availability, a field indicating buffer occupancy, a field indicating UL channel conditions, a field indicating queuing delay, a field indicating UL traffic loading, a field indicating an interference condition of the uplink, a field indicating a number of users, and so forth. As an example, the more the available radio resources of the eNB and the better the UE's UL channel condition, the larger the value of the BRI.

Estimating an UL channel condition can be based on a sounding reference signal (SRS) transmitted by the UE, which can be measured by an eNB to determine the channel condition. Based on eNB configurations, the UE can periodically transmit the SRS, and the eNB can measure the UL channel condition based on the periodic SRS transmissions. According to the LTE standards, the SRS measurement can be used to determine an UL modulation and coding scheme (MCS). The same SRS measurement can be used as the UL channel condition input to calculate BRI values, according to the present disclosure.

Alternatively, an eNB can use a measure of negative acknowledgements (NACKs) to determine the UL channel condition. A NACK can be sent by an eNB to the UE if the eNB was unable to successfully receive a data unit from the UE in the uplink. As an example, if there are over K (K≥1) NACK(s) received during a predefined period, the eNB can determine that the UL channel condition is poor.

In other examples, the eNB can use other UL signals transmitted by the UE to determine the UL channel condition, such as a demodulation reference signal (DMRS), a random access preamble, and so forth.

In some examples, the available radio resource of the eNB can be calculated in the following way. A radio resource of the eNB can include a resource block (RB), which includes a specified number of subcarriers (of different frequencies) in a specified time slot. Assume the total UL RBs is M, and the average number of used RBs during the last predefined period T is N, then the available radio resource of the eNB can be calculated as N/M. The value can range from 0 to 100%. In another example, the available radio resource can be value of N, ranging from 1 to M.

In some implementations, the macro cell eNB can control the value range of a BRI provided by a small cell eNB. The value range of the BRI can be controlled by specifying a maximum value of the small cell eNB's BRI, or the minimum value of the small cell eNB's BRI, or both. A default BRI may be implicitly indicated if the eNB does not transmit any BRI. When there are more than two eNBs involved in the UL bearer split, each small cell eNB can individually determine its BRI value.

An eNB only transmits a BRI to a UE when there are UL split bearers established for the UE. A UL split bearer refers to splitting UL data into multiple portions for UL transmission to multiple eNBs. During an initial radio bearer setup stage, the eNB is aware that the UL split bearer is established for the UE. If the UE does not have a UL split bearer, the eNB does not have to determine the BRI for the UE.

The eNB can transmit a BRI to the UE in response to the eNB receiving a scheduling request (SR) from the UE. An SR is a request for scheduling a radio resource for uplink transmission by the UE to the eNB. Alternatively, the eNB can periodically transmit the BRI to the UE to assist the UE's BSR procedure. The eNB can also transmit the BRI to the UE in response to changes in the calculated value of the BRI, such as when a change in the values exceeds a specified threshold.

The BRI can be transmitted to the UE using various different radio signalling messages, such as a Radio Resource Control (RRC) message or a MAC CE. If a MAC CE is used to carry the BRI, an index can be included in a header of the MAC CE, where different values of the index indicate different types of MAC CEs. Examples of index values are provided in Table 6.2.1-1 of 3GPP TS 36.321. An example modified version of Table 6.2.1-1 of 3GPP TS 36.321 is provided below, with the table including an entry (with underlined text) for a new MAC CE (for N=64) that includes the BRI:

TABLE 6.2.1-1

Values of LCID for DL-SCH

| Index | LCID values |
|---|---|
| 00000 | CCCH |
| 00001-01010 | Identity of the logical channel |
| 01011-11001 | Reserved |
| 11010 | Buffer Reporting Indicator |
| 11011 | Activation/Deactivation |
| 11100 | UE Contention Resolution Identity |
| 11101 | Timing Advance Command |
| 11110 | DRX Command |
| 11111 | Padding |

The table above is an example modified version of Table 6.2.1-1 of 3GPP TS 36.321. A "new" MAC CE is a MAC CE that is not defined by a current standard. In the table above, an index value of 11010 corresponds to a "Buffer Reporting Indicator", which is the BRI discussed above.

Figure 4:
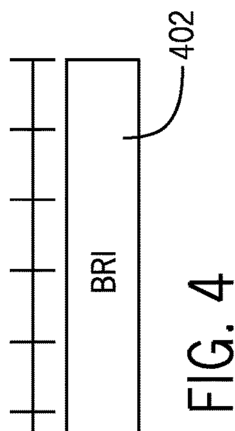
FIG. 4 illustrates an example buffer reporting indicator, according to some implementations.

In some examples, the BRI control element can be identified by a MAC PDU subheader with LCID as specified in a modified version of Table 6.2.1-2 (as set forth above). The BRI has a fixed size and is made up of one octet containing a BRI field. The buffer reporting indicator MAC control element is defined as follows:

FIG. 4 shows an example BRI field 402 (which can be 6 bits in length in an example. The BRI field 402 contains the value of the BRI. In the depicted example, the 6 bits of the BRI field 402 is used to represent a value from 0 to 63, each representing an absolute BRI number.

In another example, the 6 bits of the BRI field 402 can be separated into 2 sub-fields, each having 3 bits. The first sub-field is used to identify the channel condition (from 0 to 7, the higher the number, the better the channel condition), and the second sub-field is used to identify a buffer occupancy status (from 0 to 7, the higher the number, the greater the available space in the buffer).

Figure 5:
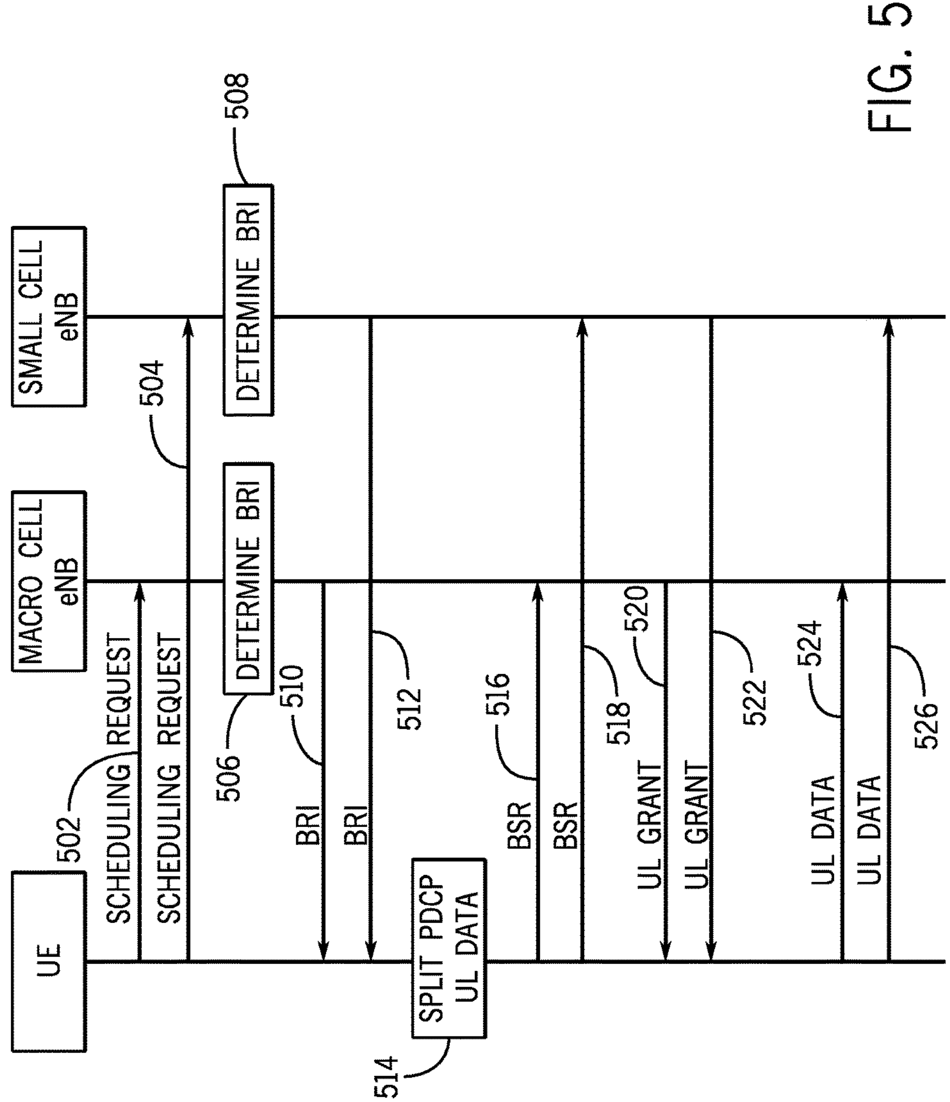
FIG. 5 is a message flow diagram of an example network-assisted UE-based bearer split process, according to some implementations.

In the network-assisted UE-based buffer status reporting technique or mechanism according to some implementations of the present disclosure, as shown in FIG. 5, when there is UL data available for transmission on an UL split bearer (including UL data portions to be transmitted to multiple eNBs), the UE first sends (at 502, 504) scheduling requests (SRs) to the macro cell eNB and the small cell eNB. Following the reception of the respective SR, the macro cell eNB determines (at 506) its BRI value based on the factor(s) discussed above, and the small cell eNB independently determines (at 508) its BRI value based on the factor(s) discussed above. If the UE is concurrently connected to more than one small cell eNB, each small cell eNB may determine its own BRI value for signalling to the UE.

The macro cell eNB and the small cell eNB transmit (at 510, 512) their BRI values individually to the UE. In response to the received BRI values, the UE splits (at 514) the PDCP UL data for BSR reporting. Note that in some implementations, there does not have to be coordination between the macro cell eNB and the small cell eNB during the calculation of BRI values (at 506, 508).

The UE then transmits (at 516) a BSR to the macro cell eNB, and transmits (at 518) a BSR to the small cell eNB. The UE receives (at 520) an UL grant from macro cell eNB based on the BSR sent at 516, and receives (at 522) an UL grant from the small cell eNB based on the BSR sent at 518.

The UE transmits (at 524) UL data to the macro cell eNB according to the UL grant (at 520) from the macro cell eNB, and transmits (at 526) UL data to the small cell eNB according to the UL grant (at 522) from the small cell eNB.

The macro cell eNB or small cell eNB can transmit the BRI to the UE upon request of the UE, such as in response to the SR. In another example, the macro cell eNB or small cell eNB can transmit the BRI to the UE when certain condition(s) is (are) satisfied, such as when a change in the BRI value as compared to a previously calculated BRI value exceeds a specified threshold. The BRI can also be delivered periodically—the period can be set to a relatively long time length to reduce a signalling load.

The following describes further how the UE determines the amount of UL data to report in each BSR sent (at 516, 518) to the respective macro cell eNB or small cell eNB, based on the BRI values received from both the macro cell eNB and the small cell eNB (at 510, 512). In an example, the cost of wireless communication with the small cell eNB and cost of wireless communication with the macro cell eNB may be different. As a result, a user may set up a preference for data communication over the lower cost wireless link. The cost on a wireless link between the UE and an eNB can be determined by the UE itself based on the link type and/or identification of the link. For example, a cellular type radio connection can be more expensive than a WiFi connection or pico cell connection.

In another example, the UE may obtain information from the network during a small cell addition/modification stage. In this case, the UE may consider both the BRI and the user's preference to determine the split of UL data in a buffer, such as according to FIG. 6.

Figure 6:
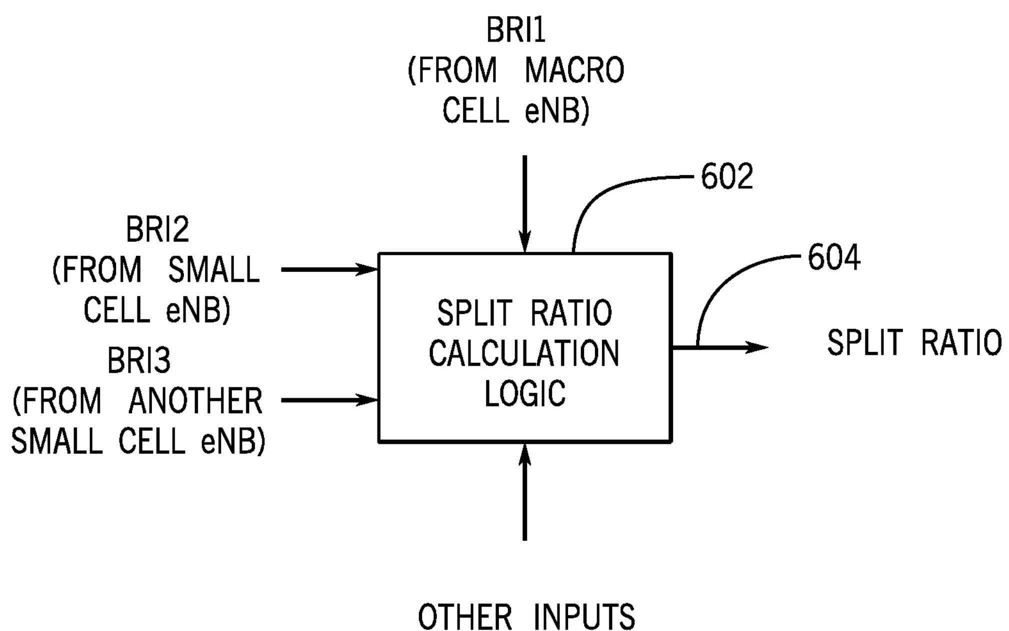
FIG. 6 is a block diagram of a split ratio calculation logic, according to some implementations.

FIG. 6 shows a split ratio calculation logic 602, which can be used to perform the determination of a split of UL data as performed at 304 (FIG. 3) or 514 (FIG. 5). The split ratio calculation logic 602 can receive various BRI values from respective eNBs, including BRI1 from the macro cell eNB, and BRI2 from a first small cell eNB. If the UE is connected to more than one small cell eNB, then the split ratio calculation logic 602 can further receive BRI3 from another small cell eNB.

The split ratio calculation logic 602 also can receive other inputs, including user preference for a particular wireless link (to a respective eNB), cost for each wireless link to the respective eNB, and so forth.

Based on the foregoing inputs, the split ratio calculation logic 602 computes a split ratio 604, which specifies a first portion of UL data (such as in the PDCP buffer 234) that is to be communicated in the uplink to the macro cell eNB, a second portion of the UL data that is to be communicated in the uplink to the small cell eNB, and so forth.

As an example, the UE can compare the BRI values from the macro cell eNB and the small cell eNB, and allocate the PDCP buffered data (UL data in the PDCP buffer 234) according to the received BRI values. In an example, the PDCP buffered data can be split simply according to the ratio of the two BRI values (e.g. the ratio of BRI1 to BRI2, in the case where the UE is connected to just the macro eNB and one small cell eNB).

The following provides an example change to the LTE standards, and more specifically, to Section 5.4.3 of 3GPP TS 36.321, according to some examples (underlined text denotes example changed text to be added).

------------ start -------------

5.4.3 Multiplexing and assembly 5.4.3.1 Logical channel prioritization

The Logical Channel Prioritization procedure is applied when a new transmission is performed.

RRC controls the scheduling of uplink data by signalling for each logical channel: priority where an increasing priority value indicates a lower priority level, prioritizedBitRate which sets the Prioritized Bit Rate (PBR), bucketSizeDuration which sets the Bucket Size Duration (BSD).

The UE shall maintain a variable Bj for each logical channel j. Bj shall be initialized to zero when the related logical channel is established, and incremented by the product PBR × TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR × BSD, where PBR and BSD are configured by upper layers.

When the UE receives the BRI values from the macro cell eNB and the small cell eNB, the UE shall split the PDCP buffer data according to the received BRI values when reporting the BSR to the macro cell eNB and the small cell eNB:

PDCP buffer data for macro cell eNB/PDCP buffer data for small cell eNB =BRI of macro cell eNB/BRI of small cell eNB.

------------ end -------------

In an alternative example, the UE may determine the PDCP buffered data split considering other factors, such as a user's preference, or quality of service (QoS) requirements; however, the major factor is still the BRI values received from the macro cell eNB and the small cell eNB. The following provides an example change to the LTE standards, and more specifically, to 3GPP TS 36.321, according to some examples (underlined text denotes example changed text to be added).

------------start--------------

When the UE receives the BRI values from the macro cell eNB and the small cell eNB, the UE shall split the PDCP buffer data according to the received BRI values when reporting the BSR to the macrocell eNB and the small cell eNB. The UE may allocate more PDCP buffer data to the eNB with larger BRI value.

-------------end--------------

In some implementations, when the UE changes an eNB (macro cell eNB or small cell eNB), the UE can keep the BRI values for the other eNB(s) that remain(s) unchanged. For example, the UE has received BRI1 from the macro cell eNB and BRI2 from a first small cell eNB. Afterwards, the UE changes from the first small cell eNB to a second small cell eNB. In this example scenario, the UE can keep the BRI1 value for the macro cell eNB, since the UE has maintained its connection to the macro cell eNB unchanged.

Further, according to some implementations, when a radio link failure (RLF) occurs on a wireless link with a give eNB, the UE may clear the BRI value of the given eNB. In some examples, the following provides an example change to Section 5.2 of 3GPP TS 36.331 (underlined text denotes example changed text to be added):

5.2 Maintenance of Uplink Time Alignment

```
.....
when a timeAlignmentTimer expires:
 - if the timeAlignmentTimer is associated with the pTAG:
    -  flush all HARQ buffers for all serving cells;
    -  notify RRC to release PUCCH/SRS for all serving cells;
    - clear any configured downlink assignments and uplink grants
      and associated BRI values;
    - consider all running timeAlignmentTimers as expired;
 - else if the timeAlignmentTimer is associated with an sTAG, then for
   all
   Serving Cells belonging to this TAG:
    - flush all HARQ buffers;
    - clear the BRI value;
    - notify RRC to release SRS.
    ......
```

Multi-Connection BSR

In accordance with some implementations of the present disclosure, to address Issue 1 discussed above, a BSR that is sent by a UE to an eNB (macro cell eNB or small cell eNB) can include an indication of the amount of PDCP UL data that is to be sent by the UE to the eNB. A BSR that includes an indication of an amount of PDCP UL data is referred to as a multi-connection (MC) BSR. An MC BSR is distinguished from a legacy BSR, which does not provide an indication of an amount of PDCP UL data—rather, a legacy BSR reports a total amount of UL data, including the combined total of the PDCP and RLC UL data.

In an MC BSR, the UE can identify which portion of UL data is from the RLC layer, and which portion of the UL data is from the PDCP layer. The amount of RLC data reported to the macro cell eNB and the small cell eNB may be different, since each eNB has its corresponding unique RLC layer in the UE, such as RLC layer 220 and RLC layer 228 in FIG. 2.

The amount of PDCP data reported to the macro cell eNB and the small cell eNB should be the same. For a dual connection scenario, there is one common PDCP layer (e.g. 222 in FIG. 2) in the UE for both the macro cell eNB and the small cell eNB. By differentiating the RLC UL data and the PDCP UL data in an MC BSR reported by the UE, the network is made aware of the amount of the PDCP UL data that is to be split. Therefore, after the network receives the MC BSR, the network can determine the amount of PDCP data for the macro cell eNB and the amount of PDCP data for the small cell eNB, and the corresponding UL grants can be delivered to the UE.

The foregoing features of the present disclosure can lead to more efficient network operation in cases where the macro cell eNB and the small cell eNB are able to coordinate relatively quickly on the UL grant allocation, so that the macro cell eNB and the small cell eNB can allocate the corresponding UL grants to the UE. By including the indication of the amount of PDCP data and respective RLC data in a BSR, an eNB has more available information to make a decision regarding UL grants to provide the UE.

MC BSR to Macro Cell eNB

In some implementations, an MC BSR as discussed above is sent by the UE to just the macro cell eNB (and not to the small cell eNB to which the UE is concurrently connected). In some examples, the MC BSR that is sent to just the macro cell eNB can be in the form of a MAC Control Element (CE), with a format consistent with 3GPP TS 36.321. An example modified version of Table 6.2.1-1 in 3GPP TS 36.321 is provided below, with the table including an entry (with underlined text) for a new MAC CE (for N=64) that includes the MC BSR:

TABLE 6.2.1-2

Values of LCID for UL-SCH

| Index | LCID values |
|---|---|
| 00000 | CCCH |
| 00001-01010 | Identity of the logical channel |
| 01011 | CCCH |
| 01100-10110 | Reserved |
| 10111 | MC BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the table above, an index value of 10111 in the header of a MAC CE indicates that the MAC CE is an MC BSR.

Figure 7:
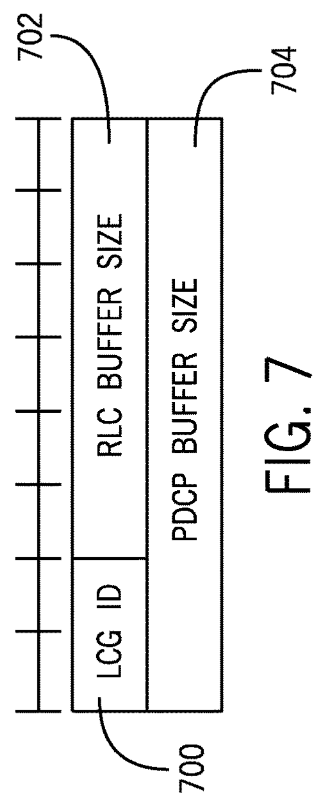
FIG. 7 illustrates an example buffer status report (BSR), according to some implementations.

An MC BSR MAC CE according to an example is depicted in FIG. 7, which includes a field 702 for indicating the buffer size of the RLC buffer, and a field 704 for indicating the buffer size of the PDCP buffer. The RLC buffer size field 702 may include a value that indicates a total amount of UL data available across all logical channels of a logical channel group (LCG) as identified by an identifier of the LCG (specified in an LCG ID field 700 in the MAC CE shown in FIG. 7) after all MAC PDUs for a transmission time interval (TTI) have been formed in the RLC layer. An LCG can refer to a group of logical channels for which buffer status reporting is provided.

The amount of UL data can be indicated as a number of bytes, or using other units. The RLC buffer size field 702 includes just the UL data that is available for transmission in the RLC layer.

The PDPC buffer size field 704 may contain a value that indicates a total amount of UL data available across all logical channels of an LCG after all MAC PDUs for the TTI have been formed in the PDCP layer. The PDCP buffer size field 704 includes just the UL data that is available for transmission in the PDCP layer.

Figure 8:
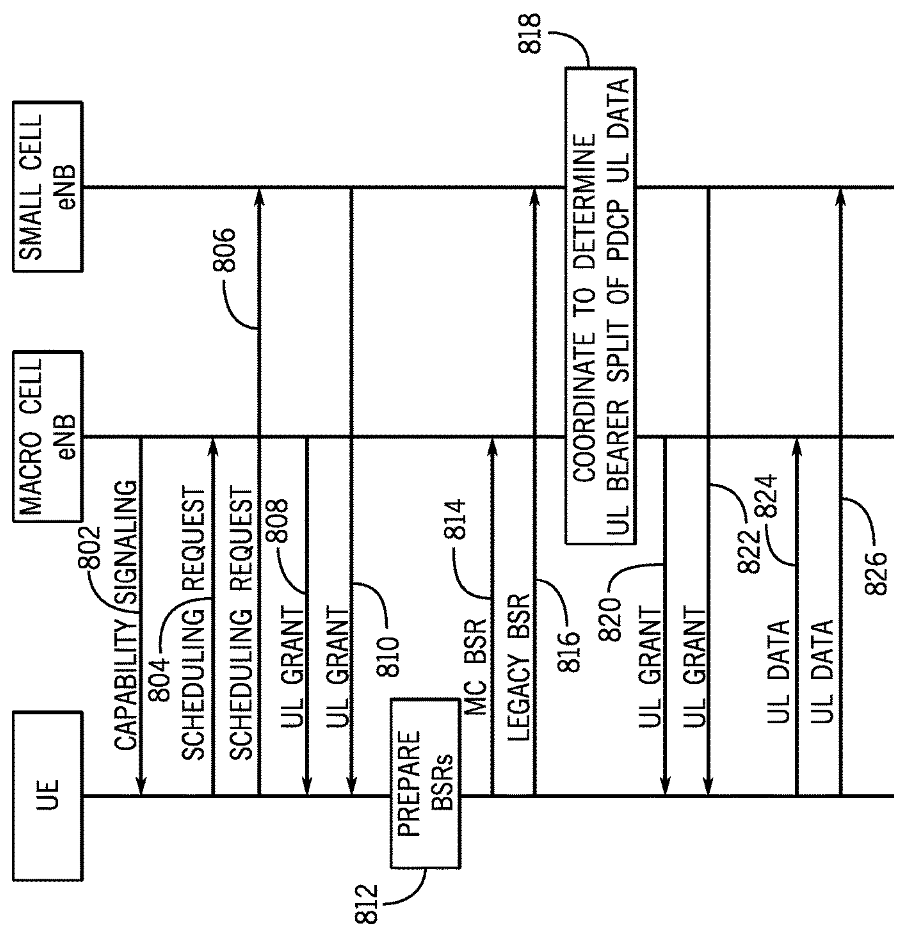
FIGS. 8 and 10 are message flow diagrams of example processes for sending uplink data, according to various implementations.

FIG. 8 is a message flow diagram that involves a UE, a macro cell eNB and a small cell eNB, according to some implementations.

The UE receives (at 802) capability signaling from the macro cell eNB. The capability signaling includes an indication that UL bearer split is supported—this also indicates that the new BSR format (i.e. the MC BSR discussed above) is supported.

The UE transmits (at 804) a scheduling request (SR) to the macro cell eNB, and transmits (at 806) an SR to the small cell eNB. The UE then receives UL grants (808, 810) from the respective macro cell eNB and small cell eNB, where the UL grants are responsive to the SRs. The UL grants are messages or information elements that provide resources to the UE to send control messaging (and more specifically, BSRs) in the uplink.

The UE then prepares (at 812) BSRs to send to the macro cell eNB and the small cell eNB. In some examples, the BSR prepared for the macro cell eNB is an MC BSR, while the BSR prepared for the small cell eNB is a legacy BSR.

The UE then transmits (at 814) the MC BSR to the macro cell eNB, and transmits (at 816) the legacy BSR to the small cell eNB.

The macro cell eNB and the small cell eNB then coordinate (at 818), based on the received BSRs, to determine the UL bearer split of the PDCP UL data. The coordination can involve exchange of messaging between the macro cell eNB and the small cell eNB over the backhaul link. The determined UL bearer split indicates a first portion of PDCP UL data that is to be sent from the UE to the macro cell eNB, and a second portion of PDCP UL data that is to be sent from the UE to the small cell eNB.

In an example of the coordination discussed above, the macro cell eNB determines the amount of PDCP UL data the macro cell eNB may be able to receive from the UE—the macro cell eNB indicates that determined amount to the small cell eNB. The small cell eNB then subtracts this determined amount (provided by the macro cell eNB) from the BSR reported by the UE to produce a resultant amount of the PDCP UL data that is to be received by the small cell eNB. The small cell eNB allocates the UL grant for the resultant amount. In some examples, the following factors can be considered for determining the UL bearer split: the resource usage status in the macro cell eNB and small cell eNB, the UL channel condition between the UE and the macro cell eNB or small cell eNB, the average queuing delay status, the operator policy, and so forth.

In response to the determined UL bearer split, the macro cell eNB sends (at 820) an UL grant to the UE (granting resources to the UE to send a first portion of the UL data to the macro cell eNB), and the small cell eNB sends (at 822) an UL grant to the UE (granting resources to the UE to send a second portion of the UL data to the macro cell eNB). The UL grants sent (at 820, 822) specify the resources for use by the UE to send (at 824, 826) respective UL data portions to the respective macro cell eNB and the small cell eNB.

MC BSR to Small Cell eNB

The foregoing discussed the sending of an MC BSR from the UE to just the macro cell eNB. In alternative examples, an MC BSR (which indicates an amount of PDCP data) can be sent to just the small cell eNB, and not to the macro cell eNB. For such implementations, tasks 814 and 816 of FIG. 8 are modified so that in task 814, the UE sends a legacy BSR to the macro cell eNB, and in task 816, the UE sends an MC BSR to the small cell eNB.

New MC PDCP BSR MAC CE

In alternative examples, a different new MC PDCP BSR MAC CE (a new MAC CE for carrying an MC BSR for PDCP UL data) can be used to indicate the amount of PDCP UL data. When UL bearer split is used, both the legacy BSR and the new MC PDCP BSR can be transmitted to the macro cell eNB or the small cell eNB. If a MAC CE is used to carry the BRI, an index can be included in a header of the MAC CE, where different values of the index indicate different types of MAC CEs. Examples of index values are provided in Table 6.2.1-1 of 3GPP TS 36.321. An example modified version of Table 6.2.1-1 of 3GPP TS 36.321 is provided below, with the table including an entry (with underlined text) for the new MC PDCP BSR MAC CE:

TABLE 6.2.1-2

Values of LCID for UL-SCH

| Index | LCID values |
|---|---|
| 00000 | CCCH |
| 00001-01010 | Identity of the logical channel |
| 01011 | CCCH |
| 01100-10110 | Reserved |
| 10111 | MC PDCP BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 9:
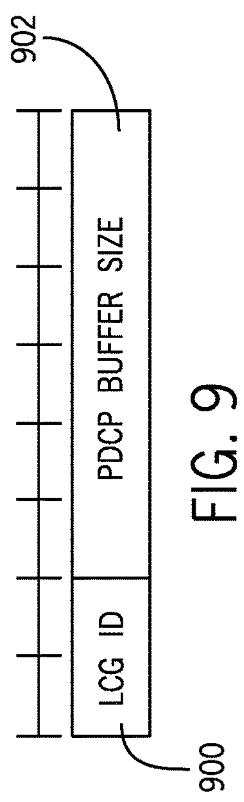
FIG. 9 illustrates another example buffer status report (BSR), according to alternative implementations.

FIG. 9 shows an example MC PDCP BSR MAC CE, which includes an LCG ID field 900 (for identifying an LCG), and a PDCP buffer size field 902 that indicates an amount of PDCP data available across all logical channels of an LCG after all MAC PDUs for the TTI have been formed.

The MC PDCP BSR MAC CE of FIG. 9 differs from the MC BSR MAC CE of FIG. 7 in that the MC PDCP BSR MAC CE of FIG. 9 does not include an RLC buffer size field. In other words, the MC PDCP BSR MAC CE of FIG. 9 is used to report just the PDCP buffer size.

For implementations where the MC PDCP BSR MAC CE of FIG. 9 is used, task 814 of FIG. 8 is modified so that in task 814, the UE sends an MC PDCP BSR MAC CE of FIG. 9 to the macro cell eNB.

Predetermined Split

The foregoing refers to examples where the macro cell eNB and the small cell eNB coordinate with each other to determine an UL bearer split after receiving BSRs from the UE. In alternative implementations, the macro cell eNB and the small cell eNB can instead apply a predetermined UL bearer split, so that coordination between the macro cell eNB and the small cell eNB responsive to receiving BSRs does not have to be performed.

Figure 10:
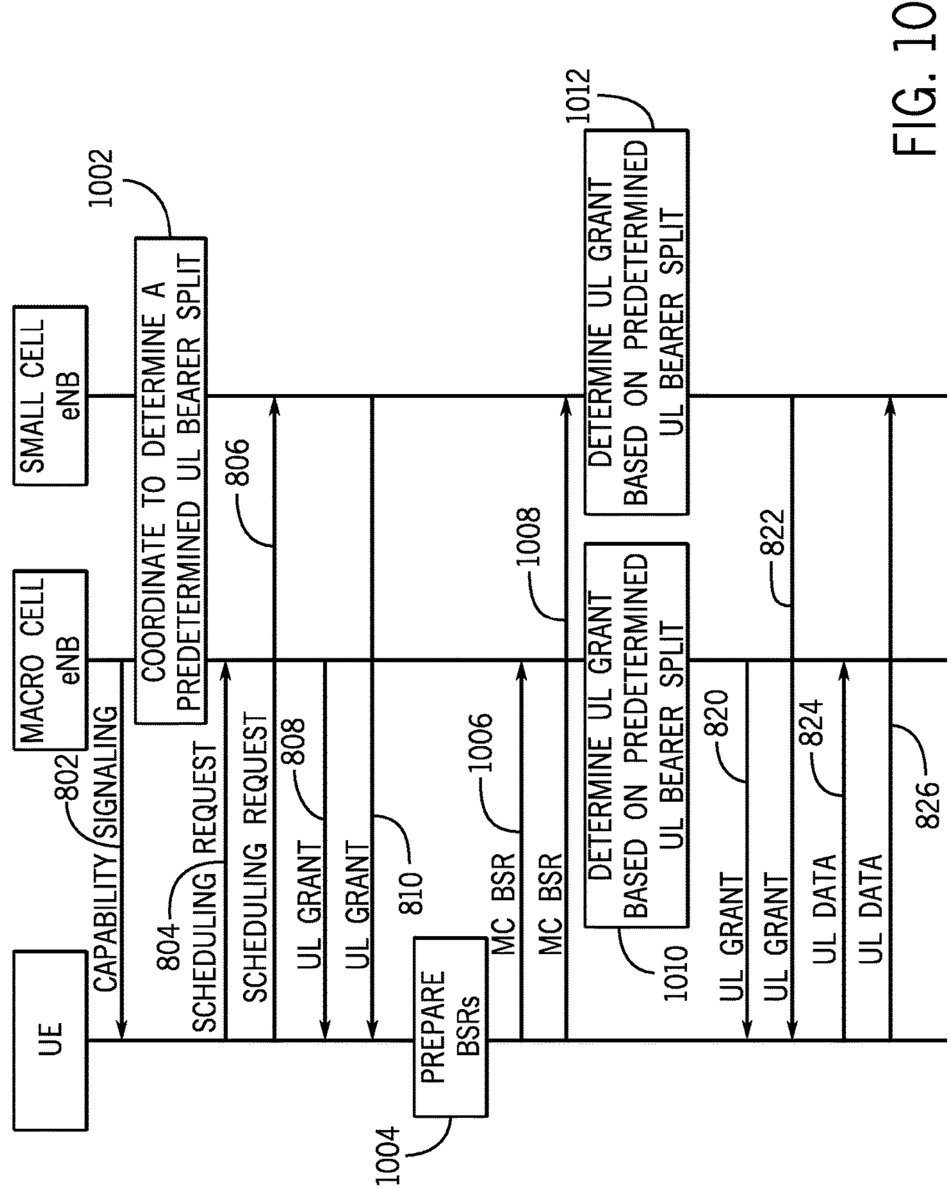

FIG. 10 is a message flow diagram of a process according to the foregoing alternative implementations. Tasks in FIG. 10 that are the same or similar as tasks in FIG. 8 are assigned the same reference numerals, and are not discussed further.

In FIG. 10, prior to receiving BSRs from the UE, the macro cell eNB and the small cell eNB can coordinate (at 1002) to determine a predetermined UL bearer split, to be used later.

The UE prepares (at 1004) BSRs to send to the macro cell eNB and the small cell eNB. In FIG. 10, the BSRs sent to both the macro cell eNB and the small cell eNB are MC BSRs that indicate an amount of PDCP UL data.

The UE sends (at 1006) an MC BSR to the macro cell eNB, and sends (at 1008) an MC BSR to the small cell eNB. Each MC BSR can be included in a MAC CE having the format of FIG. 7. The macro cell eNB and the small cell eNB can the respond to the respective MC BSRs by applying the predetermined bearer split of the PDCP UL data, independently and without any instant coordination between the macro cell eNB and the small cell eNB, to determine (at 1010, 1012) the respective UL grants to send back to the UE.

As an example, assume that the predetermined UL bearer split (determined at 1002, for example) is the split ratio 40:60 (40% of the PDCP data is to be transmitted to the macro cell eNB, and 60% of the PDCP data is to be transmitted to the small cell eNB). When the UE reports a BSR to the macro cell eNB indicating that the RLC buffered data is 2 k bytes, and the PDCP buffered data is 5 k bytes, the macro cell eNB allocates UL resources corresponding to 2 k+5 k*0.4=4 k bytes. Similarly, assume the UE reports a BSR to small cell eNB indicating that the RLC buffered data is 3 k bytes and the PDCP buffered data is 5 k bytes, the small cell eNB allocates UL resources corresponding to 3 k+5 k*0.6=6 k.

In another alternative, to simplify the standards change, the UE may send legacy BSRs (rather than the MC BSRs) to both the macro cell eNB and the small cell eNB. To improve the signaling efficiency when the amount of UL data is small, a threshold based approach can be used, i.e. if the buffered data in the UE is less than a threshold, the UE only transmits the legacy BSR to the macro cell eNB; if the buffered data in the UE is greater than a threshold, the UE transmit the legacy BSRs to both macro cell eNB and small cell eNB. Although there is a potential double reporting issue here, it is a simple implementation to avoid much standards change.

The threshold value can be signaled to the UE either via dedicated RRC signaling during the multi-connectivity setup stage or the split bearer setup stage, or via a new MAC CE sent from the macro cell eNB. When the UE changes from one small cell to another small cell, the threshold value can be cleared and a new value can be assigned. After the eNBs receive the legacy BSRs, the eNBs can apply the predetermined split ratio for the UL bearer split, for example, 40% and 60% split ratio.

In some situations, if the UE sends a BSR to only one eNB, for example, macro cell eNB, and the UE receives grants from both the macro cell eNB and the small cell eNB, in one alternative, the UE can simply follow the received grants from both eNBs and perform the UL transmissions. In another alternative, the UE may first fill out the grants from the eNB that UE sends the BSR, and then fill out the grants from other eNBs that UE does not send the BSRs. In yet another alternative, the UE may ignore the grants from the cell to which the UE did not transmit the BSR.

Capability Signaling

In the foregoing examples, before the UE sends a new format BSR (MC BSR) to the macro cell eNB or small cell eNB, the UE may have to understand the capability of the respective eNB in advance. Otherwise, the eNB may ignore the new format BSR and a delay may result. In an example, the macro cell eNB may indicate to the UE that it can support the UL bearer split function (the new format MC BSR) during a multi-connection establishment stage.

Figure 11:
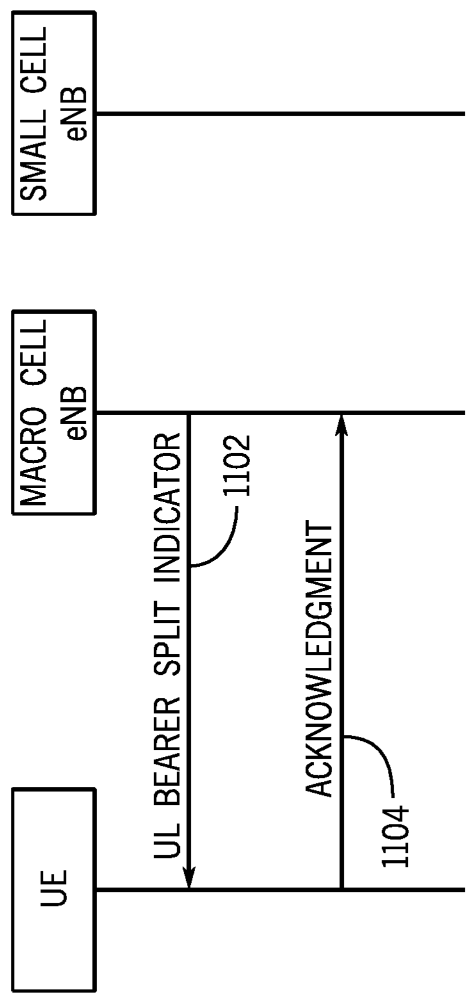
FIGS. 11 and 12 are message flow diagrams of example processes for determining whether an uplink bearer split function is supported, according to some implementations.

FIG. 11 is a message flow diagram showing how the UE can be provided with advance notification of whether the new format BSR is supported. The macro cell eNB sends (at 1102) a message (e.g. a RadioBearerReconfiguration message, a RadioResourceReconfiguration message, a RRCConnectionReconfiguration, or a System Information Block) to the UE containing a UL bearer split indicator.

If the UE understands the UL bearer split indicator, then the UE sends (at 1104) an acknowledgment back to the macro cell eNB.

After the UE receives the UL bearer split indicator, the UE is aware that the UL bearer split function is supported for multi-connectivity, so that the UE may transmit the new format MC BSR to the macro cell eNB or small cell eNB. If the UE does not receive the UL bearer split indicator, the UE does not assume the network supports the new format MC BSR, and continues to use the legacy BSR.

Figure 12:
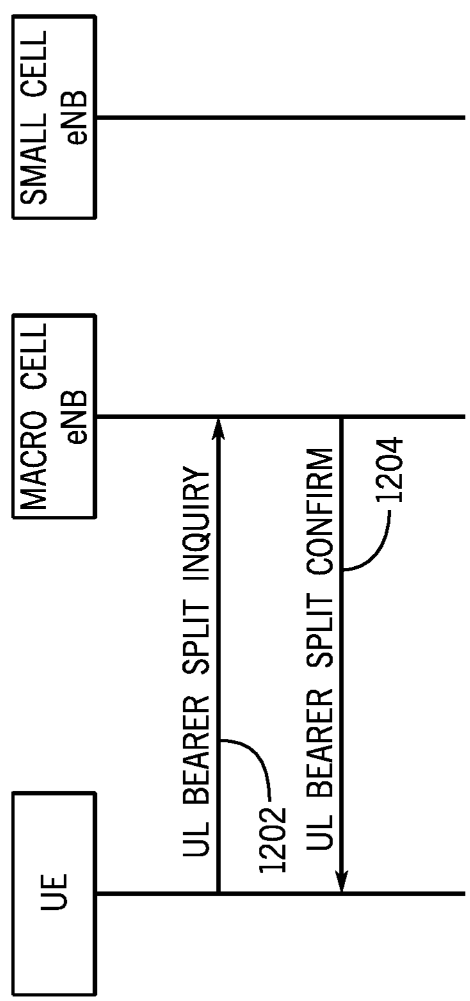

In an alternative example, the UE can request information regarding whether the UL bearer split is supported from the macro cell eNB, as shown in FIG. 12.

A UE that supports the new MC BSR format sends (at 1202) a message to the macro cell eNB, where the message contains a UL bearer split inquiry to determine whether the macro cell eNB supports the UL bearer split function (i.e. the new MC BSR format). The macro cell eNB can respond (at 1204) with a confirmation that the UL bearer split function is supported.

In this alternative according to FIG. 12, before the UE initiates a transmission of new format MC BSR, the UE can send a UL bearer split inquiry to the macro cell eNB, and the macro cell eNB may respond with UL bearer split Confirm, which acknowledges the capability to support the new format BSR. Then the UE could use the new format MC BSR.

Macro Cell eNB and Small Cell eNB Coordination Signaling

In some of the examples discussed above, the macro cell eNB and small cell eNB may exchange information to determine a UL bearer split (e.g. task 808 in FIG. 8). For example, after the macro cell eNB determines the amount of PDCP data the macro cell eNB can receive, the macro cell eNB sends the determined amount to the small cell eNB over a backhaul link so that the small cell eNB can properly determine how much remaining PDCP data the small cell eNB is to receive.

Figure 13:
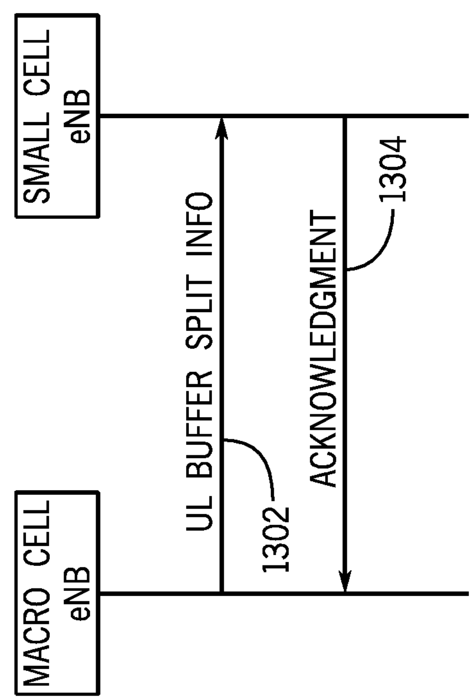
FIG. 13 is a message flow diagram of an example coordination process between a macro cell wireless access network node and a small cell wireless access network node, according to some implementations.

The backhaul link between the macro cell eNB and the small cell eNB can be an X2 interface. As shown in FIG. 13, the macro cell eNB can send (at 1302) a new information element, UL Buffer Split Info, to the small cell eNB to indicate the amount of data the macro cell eNB is to receive from the UE. A "new" information element can refer to an information element that is not defined in the current standards.

The small cell eNB can acknowledge (at 1304) the reception of the UL Buffer Split Info element. Similarly, the small cell eNB can also send a UL Buffer Split Info element to the macro cell eNB to indicate the buffer spit information. In an example, the UL Buffer Split info element can have a length of one byte (or some other length) for indicating the amount of PDCP data that the respective eNB is to receive from the UE.

In some examples, the UL Buffer Split Info element can be included in an existing X2 messages, such as X2-AP: SMALL CELL ENB MODIFICATION REQUEST, and the acknowledgment can be included in an existing X2 message, such as X2-AP: SMALL CELL ENB MODIFICATION REQUEST ACKNOWLEDGE. Other X2 messages may also be used to encapsulate the UL Buffer Split Info element and the corresponding acknowledgment.

System Architecture

The various tasks discussed above can be performed by machine-readable instructions that can be executed on one or multiple processors, such as processor(s) in a macro cell eNB, in a small cell eNB, or in a UE.

Figure 14:
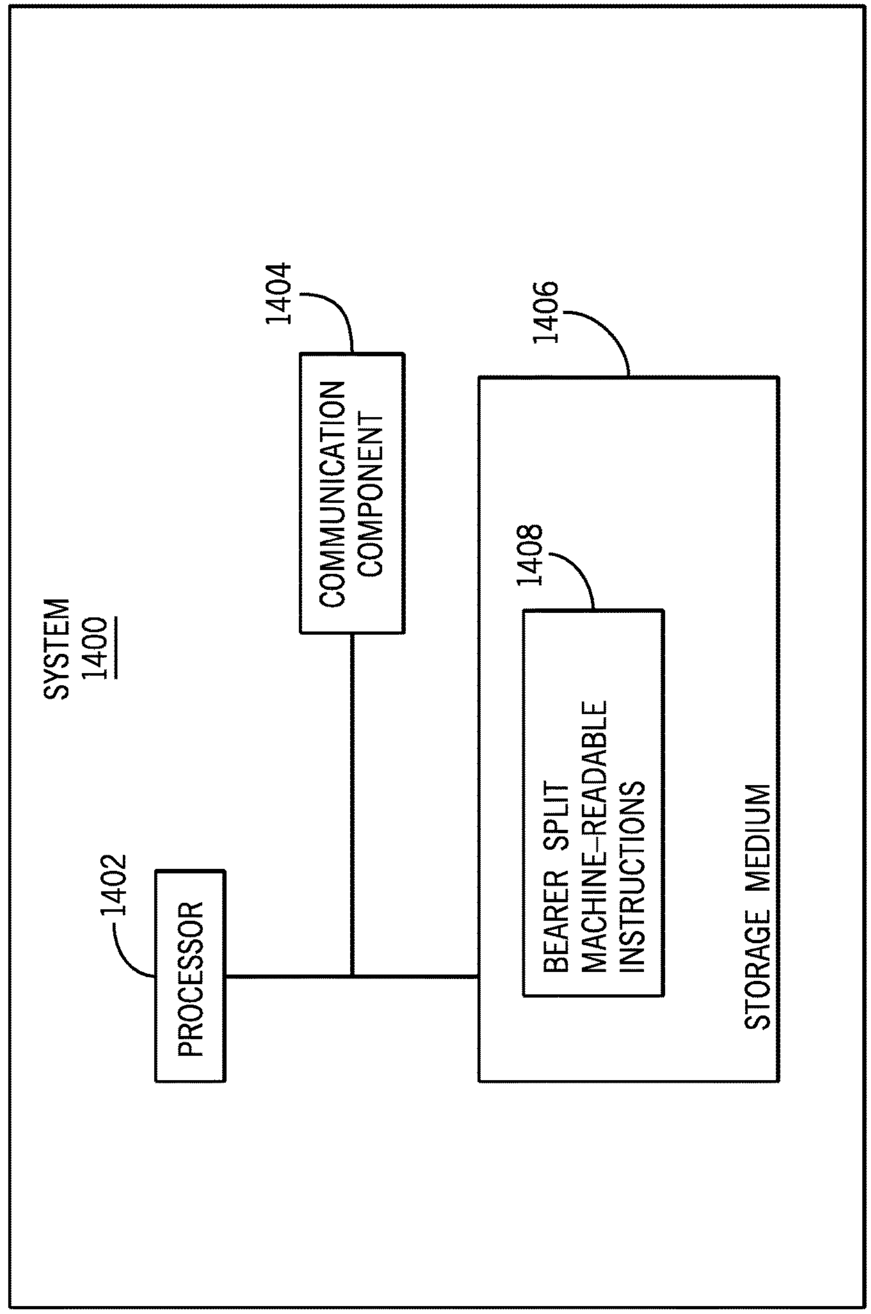
FIG. 14 is a block diagram of an example system according to some implementations.

FIG. 14 is a block diagram of an example system 1400, which can represent any of a macro cell eNB, a small cell eNB, or a UE. The system 1400 can be implemented with a computer, or with an arrangement of multiple computers. The system 1400 includes a processor (or multiple processors) 1402. A processor can include a microprocessor, microcontroller, processor module or subsystem, programmable integrated circuit, programmable gate array, or another control or computing device.

The processor(s) 1402 can be coupled to a communication component (or communication interface) 1404, which can perform wireless communications with another node. The processor(s) 1402 can also be coupled to a non-transitory machine-readable or computer-readable storage medium (or storage media) 1406.

The storage medium (or storage media) 1406 can store bearer split machine-readable instructions 1408 that are executable on the processor(s) 1402 to perform various tasks as discussed above. The storage medium (or storage media) 1406 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:

receiving, by a user equipment (UE) from a plurality of wireless access network nodes, respective indicators, the UE being concurrently connected to the plurality of wireless access network nodes; and determining, by the UE based on the indicators, a split of uplink data in a buffer of the UE into a plurality of uplink data portions for transmission by the UE to the respective wireless access network nodes, wherein each respective indicator of the received indicators from the plurality of wireless access network nodes comprises a value, and wherein the determining of the split of uplink data by the UE is based on comparing the values transmitted by the plurality of wireless access network nodes, wherein the values of the indicators are based on at least one or a combination of a plurality of factors, the plurality of factors including: uplink resource availability, buffer occupancy of a buffer in the UE, queuing delay in the UE, and a number of users.

2. The method of claim 1, further comprising:

reporting, by the UE, amounts of uplink data to be communicated by the UE to the respective wireless access network nodes, wherein the reported amounts of uplink data are according to the determined split, wherein the reporting comprises sending, by the UE, buffer status reports to the respective wireless access network nodes, each buffer status report specifying a respective amount of uplink data.

3. The method of claim 2, further comprising:

receiving, by the UE, uplink grants from respective wireless access network nodes of the plurality of wireless access network nodes, wherein the uplink grants are based on the reported amounts of uplink data.

4. The method of claim 1, wherein the determining of the split of the uplink data in the buffer of the UE into the plurality of portions is based on costs associated with wireless links between the UE and respective wireless access network nodes of the plurality of wireless access network nodes.

5. The method of claim 1, wherein the determining of the split of the uplink data in the buffer of the UE into the plurality of portions comprises determining the split of uplink Packet Data Convergence Protocol (PDCP) data in a PDCP buffer of the UE.

6. The method of claim 1, wherein the receiving of the indicators from the plurality of wireless access network nodes comprises receiving the indicators from a macro cell wireless access network node and a small cell wireless access network node.

7. The method of claim 1, wherein the value of each respective indicator of the received indicators is within a specified value range.

8. A first wireless access network node comprising:

a communication interface to wirelessly communicate with a user equipment (UE); and at least one processor configured to:

determine a value of a buffer reporting indicator based on one or more of at least the following factors: an occupancy of a buffer at the UE, and queuing delay experienced by the UE;

send, to the UE, the value of the buffer reporting indicator to cause the UE to determine a split of uplink data of a buffer in the UE into a plurality of uplink data portions to be communicated to a plurality of wireless access network nodes including the first wireless access network node to which the UE is concurrently connected; and receive a buffer status report from the UE, the buffer status report specifying an amount of uplink data according to the split determined based on the value of the buffer reporting indicator and a value of a buffer reporting indicator received by the UE from a second wireless access network node.

9. The first wireless access network node of claim 8, wherein the determining of the value of the buffer reporting indicator is based on an available resource computed based on a total number of uplink resource blocks and a number of used resource blocks during a time interval.

10. The first wireless access network node of claim 8, wherein the sending of the value of the buffer reporting indicator is in a Radio Resource Control (RRC) message or a Medium Access Control (MAC) Control Element.

11. The first wireless access network node of claim 8, wherein the determining of the value of the buffer reporting indicator and the sending of the value of the buffer reporting indicator are responsive to a scheduling request (SR) from the UE.

12. The first wireless access network node of claim 8, wherein the determining of the value of the buffer reporting indicator is without coordination of the first wireless access network with any other wireless access network node of the plurality of wireless access network nodes.

13. The first wireless access network node of claim 8, wherein each respective buffer reporting indicator of the buffer reporting indicators from the first and second wireless access network nodes comprises a value indicating an available space of a buffer in the UE, and wherein the split of the uplink data of the buffer in the UE is determined based on comparing the values in the buffer reporting indicators transmitted by the first and second wireless access network nodes.

14. A user equipment (UE) comprising:

a communication interface to wirelessly communicate with a first wireless access network node, and receive respective indicators from a plurality of wireless access network nodes including the first wireless access network node, wherein each respective indicator of the received indicators from the plurality of wireless access network nodes comprises a value regarding a channel condition of an uplink between the UE and a respective wireless access network node of the plurality of wireless access network nodes;

a Packet Data Convergence Protocol (PDCP) buffer; and at least one processor configured to:

send, to the first wireless access network node, a buffer status report specifying an amount of uplink PDCP data in the PDCP buffer, wherein the amount of the uplink PDCP data in the PDCP buffer is included in a first field of the buffer status report, and the buffer status report further includes a second field specifying an amount of uplink Radio Link Control (RLC) data; and determine a split of the uplink PDCP data into a plurality of uplink PDCP data portions for transmission by the UE to the respective wireless access network nodes, the determining based on comparing the values in the indicators transmitted by the plurality of wireless access network nodes.

15. The UE of claim 14, wherein the sending of the buffer status report to the first wireless access network node comprises sending the buffer status report in a Medium Access Control (MAC) Control Element.

16. A method comprising:

receiving, by a user equipment (UE) from a plurality of wireless access network nodes, respective indicators, the UE being concurrently connected to the plurality of wireless access network nodes; and determining, by the UE based on the indicators, a split of uplink data in a buffer of the UE into a plurality of uplink data portions for transmission by the UE to the respective wireless access network nodes, wherein each respective indicator of the received indicators from the plurality of wireless access network nodes comprises:

a first sub-field containing a value to indicate a channel condition of an uplink between the UE and a respective wireless access network node of the plurality of wireless access network nodes, and a second sub-field containing a value to indicate an available space of a buffer in the UE, wherein the determining of the split of uplink data by the UE is based on comparing the values in the first and second sub-fields of the indicators transmitted by the plurality of wireless access network nodes.

* * * * *